Patented Nov. 21, 1922.

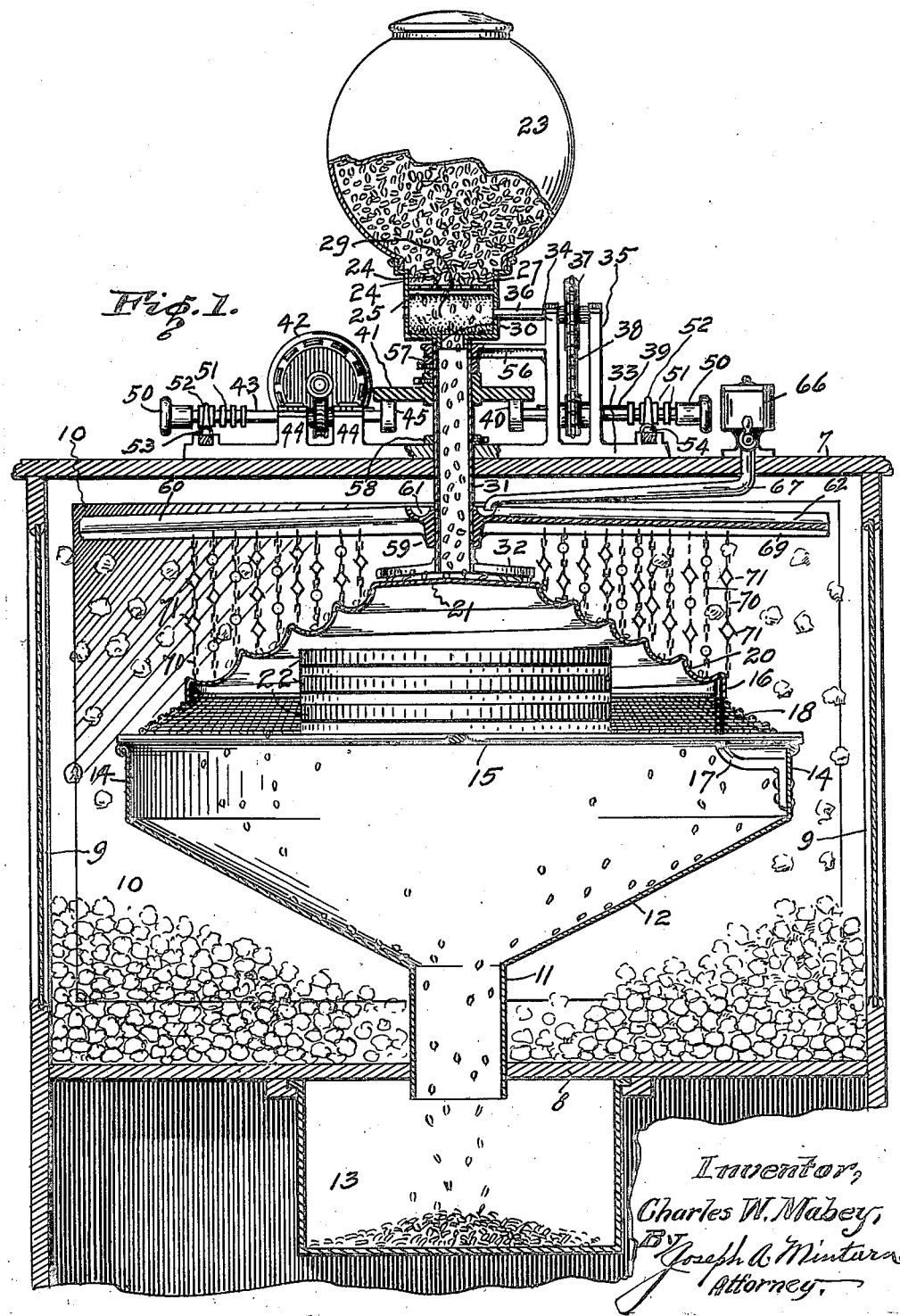

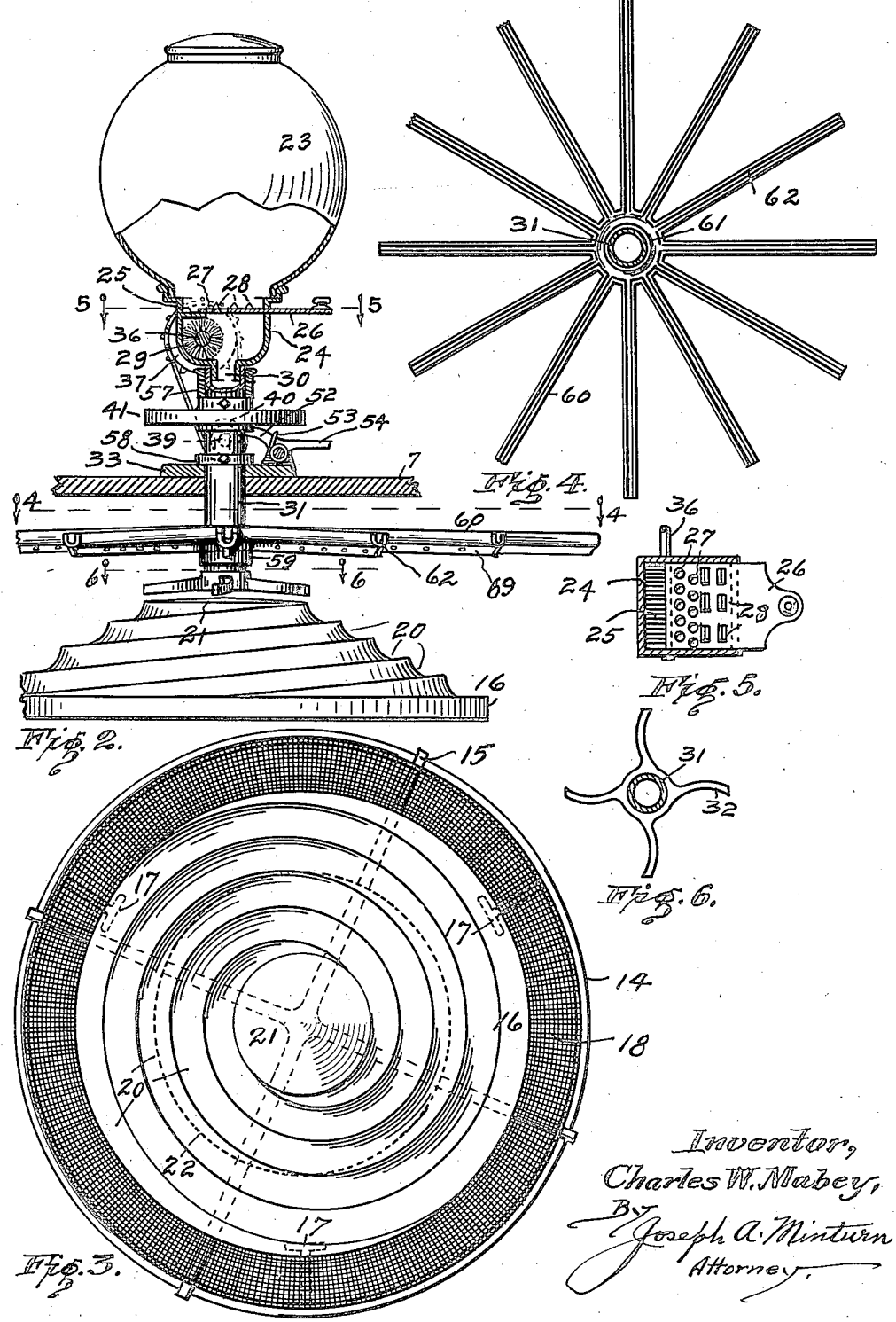

1,436,400

UNITED STATES PATENT OFFICE.

CHARLES W. MABEY, OF INDIANAPOLIS, INDIANA.

CORN-POPPING MACHINE.

Application filed October 28, 1921. Serial No. 511,196.

*To all whom it may concern:*

Be it known that I, CHARLES W. MABEY, a citizen of the United States, residing at Indianapolis, in the county of Marion and State of Indiana, have invented new and useful Improvements in Corn-Popping Machines, of which the following is a specification.

The object of this invention is to provide a machine wherein the output of popped corn is subject to control thereby enabling a greater or less quantity to be produced at the will of the operator, to suit fluctuations in sales.

With this end in view, the further object is to provide a hot plate on which the corn is popped, means for varying the temperature of the plate, and means for feeding unpopped corn to the plate in quantities which vary in proportion to changes in temperature of the plate.

Another object of the invention is to keep the corn on the plate long enough to insure that all has popped that will pop, to keep it constantly moving to prevent burning and to finally remove those grains from the plate which will not pop and to separate them from the popped corn.

A further object is to provide a machine which is of comparatively few parts and is therefore simple in construction and inexpensve to manufacture, and to provide a machine which is easy to keep in repair, inexpensive to maintain and that will be animated and attractive to customers.

I have accomplished the foregoing objects, and other objects which will hereinafter appear, by the mechanism illustrated in the accompanying drawings, in which:—

Fig. 1, is a vertical central section of my corn popping machine in operative assembly. Fig. 2, is a detail in elevation of the hot plate on whch the popping is done and mechanism for supplying corn in regulated quantities thereto, the view of the latter mechanism being from a direction at right angles to that illustrated in Fig. 1 and being shown in partial vertical section. Fig. 3, is a top plan view of the hot plate and wire sifter operating in conjunction with said plate. Fig. 4, is a detail in top plan view of the butter distributing arms as seen on the plane through the dotted line 4—4 of Fig. 2. Fig. 5, is a section on the line 5—5 of Fig. 2, and shows the adjustable valve for regulating the discharge of unpopped corn from the container, and Fig. 6 is a section on the line 6—6 of Fig. 2 showing the corn distributing fingers in top plan view.

Like characters of reference indicate like parts in the several views of the drawings.

The operative mechanism of my invention is supported in and upon a case having a top 7 and a horizontal lower partition 8. The corn as it is popped is collected and displayed in that portion of the case which is defined by the members 7 and 8. The two sides 9 and front (not shown) are preferably provided with glass closed openings through which the interior is readily visible and the back 10 is preferably lined with a mirror as shown in Fig. 1. Rigidly supported by the partition 8 is a tube 11 which supports a hopper 12 that discharges through said tube into a drawer 13. At the top of the hopper 12 is an angular flange 14 forming the support for the four arms of a metal frame 15. A member 16 is supported by brackets 17 from the flange 14 at a suitable distance above the top of flange 14 for the introduction of a truncated conical woven wire screen 18 which sifts any unpopped corn coming from the hot plate, and allows the corn to drop through into the funnel 12 from which it is deposited through tube 11 into the drawer 13.

The member 16 is preferably in the form of a truncated cone in which one or more spiral channels 20 are formed extending from a top plate 21 closing the truncated end of the cone, to the base of the cone. The plate 21 is preferably higher at its center than at its edges to cause pop corn deposited thereon to move from the center of the plate into the channels 20. Located under the member 16 and supported by the frame 15 are the electric heating elements 22, here shown as three separate elements suitably insulated from each other. These are in an electric circuit, (not shown) and a current is supplied thereto which is controlled by a three-heat indicating switch, marked "Full"—"Medium"—"Low" of usual construction, not shown. Full heat is used for heating the plate 16 to its maximum temperature, medium heat for maintaining ordinary temperatures of the plate, and low heat to keep the machine popping when the demand is small, all three elements being in the circuit at full heat, two of them at medium heat and only one of them at low heat.

The corn to be popped is contained in a holder 23, here shown as a glass globe elevated above the rest of the mechanism of my machine. It discharges through its bottom portion into a chamber 24 having a horizontal shelf 25 which works in conjunction with a sliding valve plate 26. This plate as shown in Figs. 2 and 5 has a series of openings 27 that will be more or less closed by the shelf 25, depending upon the position of the plate 26, and the latter is also provided with flanges 28 on its upper surface that act as agitators to loosen up the corn which frequently becomes packed at the outlet from the globe 23. The loosening is accomplished by reciprocating the plate 26 longitudinally by manually grasping the knob on the outer end of said plate. Corn feeding through holes 27 in quantity depending upon the number of said openings uncovered, falls upon a rotating brush 29 the purpose of which is to gather and uniformly carry the corn down to a discharge pipe 30 at the bottom of chamber 24. The pipe 30 enters the upper end of a larger pipe 31 that extends vertically down to and terminates just above the center of the plate 21 of the member 16. Unpopped corn is thus deposited upon the center of the plate 21. It is swept toward the edges of plate 21 and off of said plate by curved fingers 32 carried by the pipe 31.

Mounted on the table 7 is a base 33 having the two parallel standards, 34 and 35. Mounted in suitable journals at the upper ends of standards 34 and 35 is a shaft 36 on which the brush 29 is mounted. A sprocket wheel 37 on the shaft 36 is connected by a chain belt 38 with a sprocket wheel on a shaft 39. The inner end of the shaft 39 has a friction wheel 40 which bears against a friction drive wheel 41 mounted in a fixed manner on the pipe 31. An electric motor 42 is mounted on the base 33 and is here shown as connected by a worm gear with a shaft 43 mounted in journals on standards 44 from base 33. The shaft 43 has a friction wheel 45 that connects the wheel 41 and drives the latter by virtue of its connection with the motor 42 in the manner just described. Power is thus transmitted from motor 42 to shaft 43 and thence through wheel 45 to wheel 41 and from wheel 41 to friction wheel 40 and thence through the sprocket wheel on shaft 39 and chain 38 to wheel 37 on shaft 36, thereby rotating the brush 29. The pipe 31 carrying the arms 32 is also rotated by the mechanism just described, but at a greater speed than that of the rotation of brush 29, and the corn deposited on plate 21 is swept off of the latter into the spiral channels 20.

The shafts 39 and 43 are adjustable longitudinally to vary the distance of their respective wheels 40 and 45 from the center of rotation of the wheel 41 in order to change the speed correspondingly of their respective connected members. The given adjustments of shafts 39 and 43 relative to the center of wheel 41 are retained by like devices, a description of one of which follows. The outer ends of said shafts are provided with knobs 50 for convenient manipulation and inwardly of said knobs they are provided with a series of annular grooves 51 to successively receive a finger 52. Each finger is pivoted as clearly shown in Fig. 2 to supporting ears from the base 33, and is normally pressed by a spring 53 into a groove 51, thus locking the shaft against longitudinal adjustment while allowing the shaft to rotate. A lever extension 54 from finger 52 provides means for lifting the finger out of its groove when the shaft is to be adjusted longitudinally. An arm 56 from standard 34 supports the upper end of pipe 31 and a collar 57 on the pipe prevents upward displacement of the pipe and a collar 58 prevents downward displacement of pipe 31.

Mounted on the shaft 31 below table 7 is a hub 59 having a series of radial arms 60. An annular groove 61 is formed in the hub 59 with which channels 62 in the upper surfaces of arms 60 communicate with sufficient slope of the channels to drain away from the groove 61. A butter container 66 is mounted on the table 7 and is filled with butter in a hot liquid state. The container is connected by a pipe 67 with the groove 61 in the hub 59 whereby the fluid butter is discharged into groove 61 and distributed to the ends of each arm 60 from which it drops upon the pop corn collected in the bottom of the compartment above the partition 8. Each of the arms 60 has an underside rib 69 extending longitudinally of the arm. These ribs are transversely perforated for the attachment thereto of a plurality of depending flexible members here shown as chains 70, the purpose of which is to drop down into contact with the member 16 in the channels 20 thereof and sweep the plate by the rotary movement of the arms 60. The chains are provided with weights 71 to make the action of chains 70 more positive in sweeping the hot plate. These weights 71 will preferably be variously colored and shaped glass pieces to add to the brilliancy and attractiveness of the machine when moved by the rotation of the arms 60. The glittering effect is increased by reflection in the mirror 10 at the back of the case and altogether makes a very novel and attractive display.

I have here shown the best embodiment of my invention now known to me, but as it may obviously be varied in the details of its construction I do not desire to be limited to the precise form shown, or any more than is required by the appended claims, and having thus fully described my invention, what I claim as new and wish to secure by Letters Patent, is—

1. In a machine for popping corn, a hot plate highest at its central portion, means for supplying corn in regulated quantities to the upper portion of the plate and means for positively moving the corn to the lowest part of the plate.

2. In a machine for popping corn, a hot plate highest at its central portion and having a spiral channel in its sloping sides, means for supplying corn in regulated quantities to the top portion of the plate and means for positively moving the corn to the lowest part of the plate.

3. In a machine for popping corn, a hot plate, said plate being highest at its central portion and having a spiral channel in its sloping sides, means for supplying corn in regulated quantities to the top portion of the plate, and means for positively moving the corn down the channel.

4. In a machine for popping corn, a hot plate substantially in the form of a truncated cone highest at its truncated portion, and means for supplying corn in regulated quantities to the truncated portion of the plate.

5. In a machine for popping corn, a hot plate substantially in the form of a truncated cone having one or more spiral channels in its sloping sides, means for supplying corn in regulated quantities to the plate and means for positively moving the corn down the channels.

6. In a machine for popping corn, a hot plate in the form of a truncated cone having spiral channels in its sloping sides, an elevated corn supply receptacle, a pipe receiving corn from the receptacle and discharging upon the central portion of the hot plate, means for regulating the discharge of corn from the elevated receptacle through the pipe and means for positively moving the corn down the channels.

7. In a machine for popping corn, a hot plate in the form of a hollow truncated cone, electrical heating elements located within the hollow interior of the plate, said plate having means in its sloping sides to retard the travel of corn deposited on the plate, means for supplying corn in regulated quantities to the top portion of the plate and means for positively moving the corn down the plate.

8. In a machine for popping corn, a substantially truncated cone-shaped hollow hot plate, means for supplying corn in regulated quantities to the upper portion of the plate, spiral channels in the sloping sides of the plate, means for positively moving the corn down the channels, a hopper larger in diameter than the base of the plate located below the plate, and a sieve between the plate and the hopper.

9. In a machine for popping corn, a hot plate substantially in the form of a truncated cone, a corn supply receptacle located above the hot plate, a pipe leading from the supply receptacle and discharging upon the top of the hot plate, means for rotating the pipe at varying speeds, means carried by the pipe for positively moving the corn to the bottom of the hot plate and means for discharging corn in regulated quantities from the corn supply receptacle to said pipe.

10. In a machine for popping corn, a corn supply receptacle having a discharge through its bottom, a pipe receiving said discharge, means for regulating the amount of said discharge from the receptacle to the pipe, a friction disk on said pipe, a driving disk contacting the friction disk and adjustable on the latter to vary the speed of rotation of the pipe, a hot plate substantially in the form of a truncated cone on the top of which the pipe discharges, and means carried by the pipe for positively moving the corn to the bottom of the hot plate.

11. In a machine for popping corn, a hot plate substantially in the form of a truncated cone, a pipe moving in a rotary direction supplying corn to the top of the plate, and arms carried by the pipe having depending members sweeping the surface of the hot plate.

12. In a machine for popping corn, a hot plate substantially in the form of a truncated cone having spiral channels in its sloping sides, a rotating pipe discharging corn on the top of the hot plate, arms carried by the pipe, and depending flexible members carried by the arms for positively moving the corn down the channels.

13. In a machine for popping corn, a hot plate member, a rotating pipe discharging corn upon the member, a hub mounted on the pipe having radial arms said hub and arms having upper channels which communicate and drain from the hub to the ends of the arms, and means for supplying butter in liquid form to the channel in the hub.

14. In a corn popping machine a substantially truncated conical hot plate having spiral channels in its sloping sides, a rotating pipe discharging corn upon the top of the hot plate, radial arms carried by the pipe, flexible members carried by the arms and sweeping the channels of the hot plate to positively move the corn down the channels, and bodies carried by said flexible members to increase their weight and visibility.

15. In a corn popping machine, a hot plate substantially in the form of a hollow truncated cone having spiral channels in its sloping sides and means for supplying corn to the highest part of the plate.

16. In a corn popping machine, a hot plate substantially in the form of a hollow truncated cone highest at its truncated portion, having spiral channels in its sloping sides, a hopper larger than the base of the hot plate below the latter and a sieve extending from the hot plate to the hopper to sift out all but the popped corn and deliver the popped corn around the outside of the hopper.

17. In a corn popping machine, a hot plate substantially in the form of a hollow truncated cone, means on the inside of the conical hot-plate for varying the temperature of the plate, and means for feeding corn to the outside of the plate at the top of the plate.

Signed at Indianapolis, this the 25th day of October 1921.

CHARLES W. MABEY.